June 3, 1958  H. R. URBAN  2,837,285
THERMOSTATIC AND PRESSURE RESPONSIVE CONTROL VALVE
Filed Aug. 13, 1956
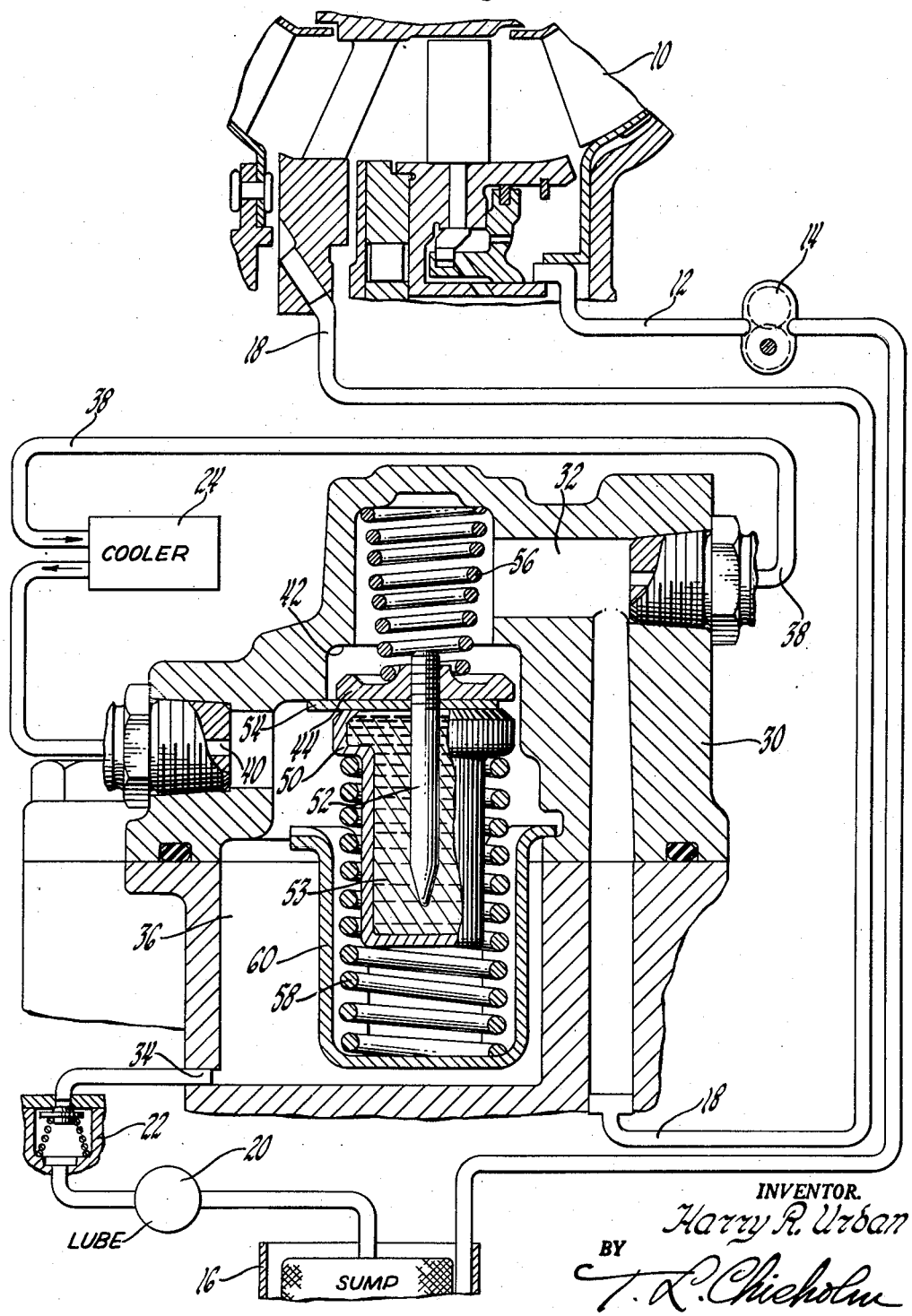
INVENTOR.
Harry R. Urban
BY
T. L. Chisholm
ATTORNEY.

United States Patent Office 2,837,285
Patented June 3, 1958

2,837,285

THERMOSTATIC AND PRESSURE RESPONSIVE CONTROL VALVE

Harry R. Urban, Oak Park, Mich., assignor to General Motors Corporation, Detroit, Mich., a corporation of Delaware Application August 13, 1956, Serial No. 603,569

4 Claims. (Cl. 236—34.5)

This invention relates to transmissions of the type having a hydrodynamic torque transfer device in which liquid is circulated to transfer torque from an input impeller member to a turbine or output member. A torque converter is an example of a transmission to which the invention may be applied.

It is customary to provide such transmissions with a pump driven by the engine which drives the transmission, or a pump driven by the vehicle which is driven by the transmission to circulate liquid through the converter under pressure, and for lubrication of the transmission generally, among other reasons, in order to remove the heat generated by the torque converter. Ordinarily the oil is led from the torque converter by a conduit having a pressure responsive relief valve which maintains a predetermined pressure in the converter. This outlet passage commonly discharges oil to the parts of the transmission which need to be lubricated, from which the oil returns to a sump, from which it is drawn by the pump and recirculated.

A large amount of heat may be generated and it is frequently essential to circulate the oil through a cooler in order to remove this heat. This creates problems of design and construction, because the coolers ordinarily have restricted passages which impose resistance to the flow of oil through them and consequently require power to circulate the oil. Also such restricted passages are easily clogged. Consequently it is desirable to have the cooler bypassed whenever the temperature of the oil does not require cooling. It is also desirable to have the cooler bypassed, even if the oil is warm, in case the cooler becomes clogged, that an ample volume of oil will always be available for lubrication.

It is among the objects of this invention to provide an improved bypass control arrangement for a cooler in the circulating system of a torque transmitting device of the character described, and to provide such a bypass control which is both temperature and pressure-responsive so that the bypass will always be open to conserve power if the liquid is cool, and so that the bypass will be open regardless of temperature in the event the cooler is clogged. Such bypass control is useful in other situations than transmissions.

Other objects and advantages of the invention will be apparent from the following description and from the accompanying drawing which is a schematic representation of a portion of a control system for a torque converter showing in section the actual structure of a bypass valve embodying one form of the invention.

Referring to the drawing, 10 represents diagrammatically any suitable hydrodynamic torque converter to which oil under pressure is supplied through an inlet conduit 12 from any suitable pump 14 which draws oil from the sump 16 which constitutes the source of supply. Oil is led from the torque converter by an outlet conduit 18 which is schematically represented as including the lubrication passages 20 of the transmission from which the oil is discharged to the sump. A pressure-responsive release valve 22 in the outlet conduit maintains the desired pressure in the torque converter. The oil flowing from the converter can either be directed through a cooler 24 or or diverted past the cooler directly to the lubrication passages and the release valve.

The invention includes a temperature-responsive and pressure-responsive bypass valve contained in a housing 30 having an inlet passage 32 connected to the converter outlet passage 18, a discharge passage 34 and an intervening chamber 36 through which oil may flow from the inlet 32 to the outlet 34. An auxiliary passage 38 communicates with the inlet passage 32 and may constitute an inlet connection for the cooler 24. A second auxiliary passage 40 communicates with the chamber 36 and this may constitute the cooler outlet connection. A valve seat 42 is formed in the casing 30 in a plane which separates the cooler outlet 40 from both the cooler inlet 38 and the converter discharge 32. A valve 44 is adapted to be closed on this seat and when so closed prevents direct flow from the inlet 32 to the outlet 36 and diverts all of the oil from the converter through the cooler. The temperature-responsive operator for the valve 44 includes a rigid closed container 50 from one end of which projects a slidable rod 52, the chamber being filled around the rod with a temperature-responsive expansible wax 53. As the wax expands due to increasing temperature, the rod 52 is pushed out of the container 50 and as the wax contracts due to decreasing temperature, the rod may be pushed back into the container by any outside force. The container is placed in the chamber 36 so that it is responsive to the temperature of oil in the chamber. A support 54 is fixed in the chamber and is so constituted that it permits the flow of oil from the inlet 32 to the outlet 36. The container is supported below the support 52 and the rod projects through this support, being secured to the valve 44 on the other side of the support in any suitable manner as by the screw threads indicated. The valve is constantly urged away from the seat by a light spring 56. The container as a whole is urged toward the seat by a heavy spring 58 which may be seated in a spring cup 60 anchored in the chamber in any suitable manner.

In normal operation if the oil flowing from the converter is below a predetermined temperature, the wax is contracted, the light spring 56 pushes the rod 52 into the container and holds the valve away from the seat 42 and toward the upper side of the support 54. The heavy spring 58 holds the container against the lower side of the support 54. The spring 56 may have a force for example of about 10 pounds which holds the valve 44 against the upper side of the support 54 under the conditions just supposed, and the spring 58 may have a force of about 30 pounds which holds the container against the lower side of the support under the same conditions.

When the temperature of the wax, which is a measure of the temperature of the oil flowing from the converter reaches a predetermined point, the wax has expanded sufficiently to move the valve 44 against the seat 42, the container meanwhile being held against the lower side of the support by the heavy spring 58. This diverts all oil from the converter through the cooler. When the oil going through the chamber 36 from the cooler reaches a predetermined point indicating that it is cool enough to be used without passing through the cooler, the wax contracts and the spring 56 opens the valve to permit flow directly through the chamber 36.

If the resistance to flow through the cooler increases enough to cause the pressure of the cooler to rise above a predetermined value, the pressure on the upper side of the valve 44 pushes the valve off its seat, pushing the rod 52 and the container 50 downward against the force of heavy spring 58 to permit oil to flow directly through the chamber 36 bypassing the cooler.

I claim:

1. A temperature and pressure-responsive control including in combination a chamber through which liquid can flow from a principal inlet to a principal outlet, an auxiliary outlet passage communicating with the chamber adjacent the principal inlet, an auxiliary inlet passage communicating with the chamber at a point separated from the principal inlet and the auxiliary outlet passage, a valve seat between the auxiliary inlet and both the principal inlet and the auxiliary outlet passage, a fixed support in the chamber, a passage to permit flow past the support from the valve seat to the principal outlet, a valve adapted to be closed on said seat to prevent flow from the principal inlet to the principal outlet, the valve being located on the upstream side of said support, a spring urging the valve away from the seat, a thermoresponsive valve actuator located on the downstream side of the support for urging the valve toward the seat, and a second spring yieldingly holding the valve actuator on the support against pressure in the auxiliary outlet.

2. A temperature and pressure-responsive control including in combination a chamber through which liquid can flow from a principal inlet to a principal outlet, an auxiliary outlet passage communicating with the chamber adjacent the principal inlet, an auxiliary inlet passage communicating with the chamber at a point separated from the principal inlet and the auxiliary outlet passage, a valve seat between the auxiliary inlet and both the principal inlet and the auxiliary outlet passage, a fixed support in the chamber, a passage to permit flow past the support from the valve seat to the principal outlet, a valve adapted to be closed on said seat to prevent flow from the principal inlet to the principal outlet, the valve being located on the upstream side of said support, a spring urging the valve away from the seat, a thermoresponsive valve actuator located on the downstream side of the support for urging the valve toward the seat, and a second spring yieldingly holding the valve actuator on the support against pressure in the auxiliary outlet, the force of the second spring being greater than the force of the first spring whereby the valve will be seated against the force of the first spring whenever the temperature of the liquid in the chamber is above a predetermined point and the pressure in the auxiliary outlet passage is below a predetermined value.

3. A temperature and pressure-responsive control including in combination a chamber through which liquid can flow from a principal inlet to a principal outlet, an auxiliary outlet passage communicating with the chamber adjacent the principal inlet, an auxiliary inlet passage communicating with the chamber at a point separated from the principal inlet and the auxiliary outlet passage, a valve seat between the auxiliary inlet and both the principal inlet and the auxiliary outlet passage, a fixed support in the chamber, a passage to permit flow past the support from the valve seat to the principal outlet, a closed rigid container filled with temperature-responsive expansible material and having an operating member extending from said material to a point outside the container, the container being located on the downstream side of the support, a valve secured to the operating member and located on the upstream side of the support, a spring urging the valve away from the seat, and a second spring resiliently holding the container on the support against pressure in the auxiliary outlet.

4. A temperature and pressure-responsive control including in combination a chamber through which liquid can flow from a principal inlet to a principal outlet, an auxiliary outlet passage communicating with the chamber adjacent the principal inlet, an auxiliary inlet passage communicating with the chamber at a point separated from the principal inlet and the auxiliary outlet passage, a valve seat between the auxiliary inlet and both the principal inlet and the auxiliary outlet passage, a fixed support in the chamber, a passage to permit flow past the support from the valve seat to the principal outlet, a closed rigid container filled with temperature-responsive expansible material and having an operating member extending from said material to a point outside the container, the container being located on the downstream side of the support, a valve secured to the operating member and located on the upstream side of the support, a spring urging the valve away from the seat, and a second spring holding the container on the support against pressure in the auxiliary outlet, the force of the second spring being greater than the force of the first spring whereby the valve will be seated against the force of the first spring when the temperature of liquid in the chamber is above a predetermined point and the pressure in the auixiliary outlet is below a predetermined value.

References Cited in the file of this patent
UNITED STATES PATENTS

| | | |
|---|---|---|
| 2,322,577 | Kuhns et al. | June 22, 1943 |
| 2,419,980 | Worth | May 6, 1947 |
| 2,423,812 | Karl et al. | July 8, 1947 |
| 2,510,473 | Jensen | June 6, 1950 |
| 2,589,538 | Haynes | May 27, 1952 |
| 2,777,638 | Wood | Jan. 15, 1957 |